May 17, 1966   G. G. GORBATENKO   3,252,101
VARIABLE GAIN OPTIMIZED FEEDBACK CONTROL SYSTEM
Filed Sept. 25, 1963   2 Sheets-Sheet 1

INVENTOR.
GEORGE G. GORBATENKO
BY Elmer Galbriati

ATTORNEY

3,252,101
VARIABLE GAIN OPTIMIZED FEEDBACK CONTROL SYSTEM
George G. Gorbatenko, San Jose, Calif., assignor to International Business Machines Corporation, New York, N.Y., a corporation of New York
Filed Sept. 25, 1963, Ser. No. 311,386
10 Claims. (Cl. 328—132)

This invention relates to feedback systems and, more particularly, to a technique for optimizing such systems.

The prior art teaches the concept of delaying a portion of the input signal to a feedback system for a certain amount of time in order to improve the response characteristics of the system. This technique is sometimes referred to as "Posicast compensation" or as "short-term memory."

The technique of Posicast compensation has been generally of only academic interest. One of the major reasons for this is that satisfactory analog delay lines are difficult to realize. Furthermore, since the amount of delay obtained from a delay line is usually fixed, the exact dynamics, and in particular the ringing frequency of the system must be known. In many cases it is impossible to know the ringing frequency during the design of the system since the parameters of the components in the system are not always predictable.

The present invention provides means for reducing the settling time of an underdamped feedback control system which has a dominant second order characteristic without the use of delay lines. The present invention is especially useful in cases where uncontrollable constraints preclude the designer from obtaining a satisfactory damping factor. The system of the present invention is easily implemented, and it is applicable to any system wherein the steady state gain of the complete system can be easily varied by a factor of approximately two without significantly affecting the dynamics of the system.

The object of the invention is to provide an improved feedback system.

Another object of the present invention is the provision of a simple, inexpensive, reliable feedback control system.

A further object of the invention is the optimization of an underdamped feedback system.

Yet another object of the present invention is the optimization of a feedback system without the use of a delay line.

A still further object of the present invention is to provide a feedback control system wherein the output arrives at its final value with a minimum amount of oscillation.

Yet another object of the present invention is to provide a feedback control system wherein the output arrives at its final value in a minimum amount of time and wherein there is a minimum amount of oscillation about the final value.

The present invention includes a feedback control system which has an underdamped second order characteristic, peak detecting means for detecting when the rate of change of the output of the system changes to zero, and means for increasing the steady state gain of the complete system by a factor of approximately two in response to the output of said peak detecting means.

The foregoing and other objects, features and advantages of the invention will be apparent from the following more particular description of a preferred embodiment of the invention, as illustrated in the accompanying drawings.

Figure 1:
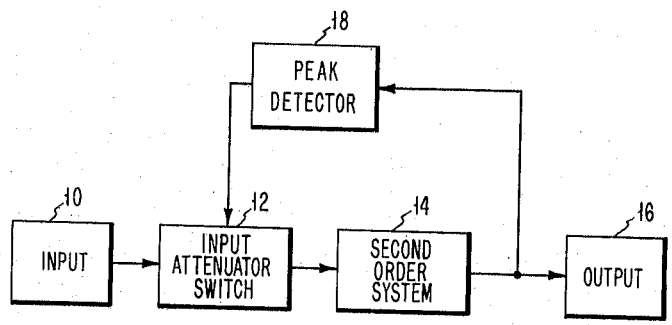
FIG. 1 shows a preferred embodiment of the present invention in block form.

As shown in FIG. 1, the system of the present invention includes: an input 10, an input attenuator switch 12, a second order system 14, an output 16 and a peak detector 18. Input 10 supplies signals to input attenuator switch 12. After an input signal is applied and before peak detector 18 applies a signal to input attenuator switch 12, the signal from input 10 is attenuated by a factor of approximately one-half before it is supplied to the second order system 14. When peak detector 18 detects the fact that the rate of change in the output of second order system 14 is zero, it supplies a signal to input switch 12 which thereafter does not attenuate the signals received from input 10.

Figure 2:
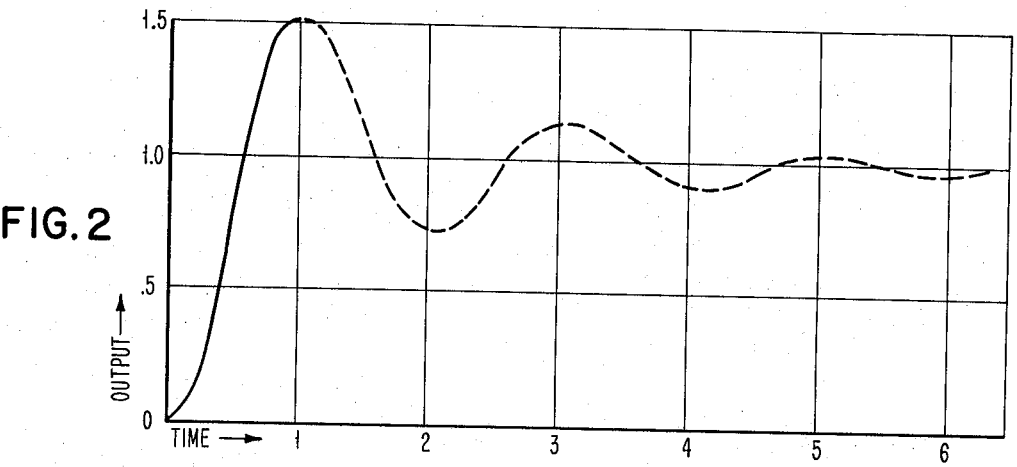
FIG. 2 shows the system response to an input of one-half unit.
Figure 3:
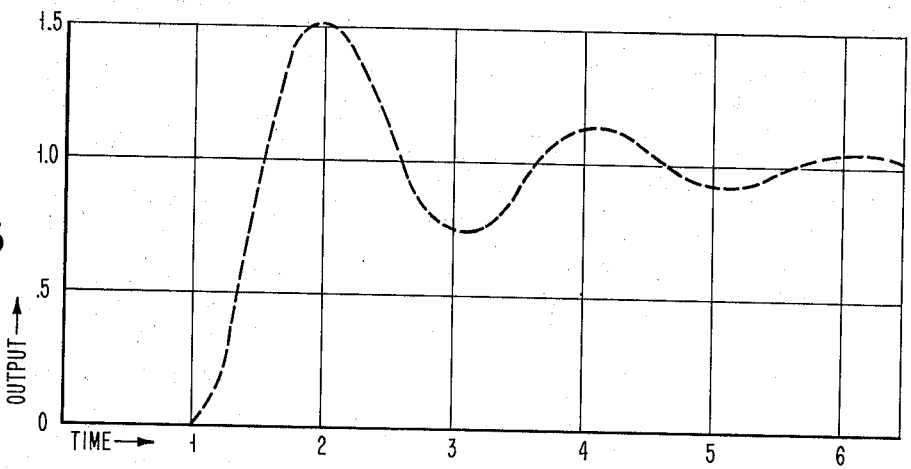
FIG. 3 shows the system response to an input signal of one-half unit which is delayed by one-half time consonant.
Figure 4:
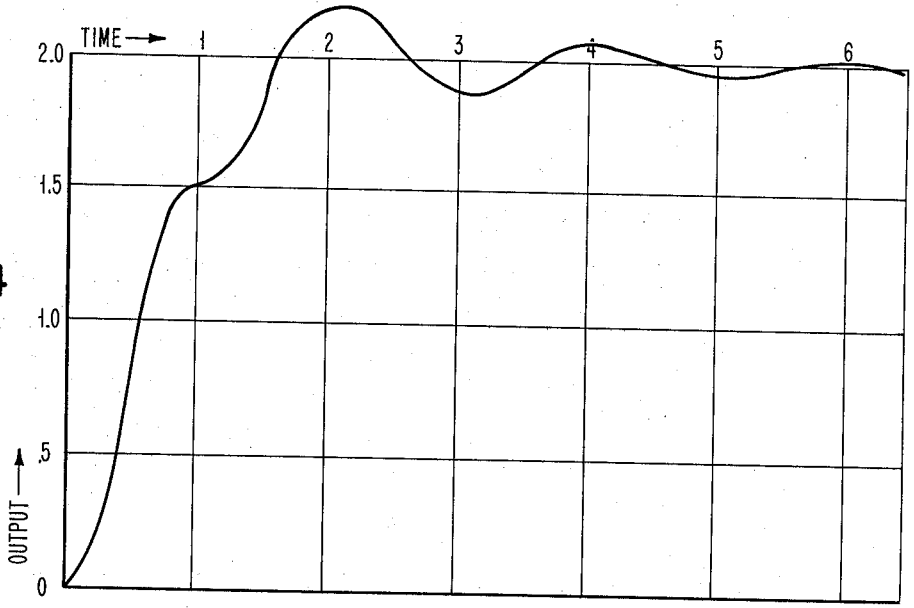
FIG. 4 shows the sum of FIGS. 2 and 3.

The system shown in FIG. 1 operates as follows: when input 10 first generates an input signal, this signal is attenuated by input attenuator switch 12. The second order system 14 responds to the attenuated signal, and sometime after the input signal is applied, the rate of change of the output of the system goes to zero. If no further action were taken the output of the system would begin to decrease. When peak detector 18 detects the fact that the rate of change of the output of system 14 is zero, it generates a signal which switches the input attenuator switch 12 so that the signal from input 10 is no longer attenuated. The initial response of the system to the attenuated signal is shown in FIG. 2, and the total response of the system is shown in FIG. 4. FIG. 3 shows the response of the system to a signal equal in magnitude to the amount that the input to system 14 is incremented in response to the signal from detector 18 and which is applied at the time that the input is incremented. The total response of the system shown in FIG. 4 is therefore the sum of FIGS. 2 and 3.

The transfer function of the second order system 14 can be written as:

$$G(s) = \frac{K}{S^2 + 2\zeta\omega_n S + \omega_n^2}$$

where:

$$\frac{K}{\omega_n^2}$$

$\omega_n$ = natural (undamped) radian frequency
$\zeta$ = damping factor.

By differentiating the equation which expresses time domain response of the system, it can be shown that when the attenuated input signal is applied to the system the time at which the rate of change of the input equals zero is given by:

$$t = \frac{\pi + x}{\omega}$$

where:

$$x = \omega_n(1-\zeta^2)^{1/2}$$
$$x = 90° - \arccos \zeta$$

For a damping factor of .2, $x$ equals 11.5°. This means that the rate of change equals zero when $\omega t = 191.5°$.

In order to achieve the best results, the amount of attenuation should be slightly less than one-half when the signal is first applied. For example, if the system has a damping factor of .2 for optimum results, 65% of the signal should be initially applied to the system. When the peak detector thereafter detects that the rate of change of the output is zero, the attenuator switch 12 is switched so that the remainder of the input signal is applied to the system. In general, the value of the initial input should be:

$$p = \frac{1}{1 + \epsilon^{-\pi \cot \theta}}$$

where:

$p$ = value of initial signal
$\theta$ = arc cos $\zeta$
$\epsilon$ = base of natural log The technique of delaying gain, described herein, can be applied to any system having an underdamped second order characteristic in which the gain can be altered by a factor of approximately two without appreciably affecting the dynamics of the system. The technique can also be applied to any underdamped second order system wherein a change in the gain changes the dynamics of the system if the ringing frequency is not appreciably changed by the change in gain. This invention applies generally to mechanical position servos as well as feedback amplifiers.

In mechanical cases, the peak can be best sensed with a tachometer, an accelerometer or a related transducer. For electrical applications, the peak can be sensed by an RC differentiator. For cases where the transducer or differentiator output is insufficient to positively close the switch (or perform like operation), amplification is required.

For low frequency operation, an electromechanical device can be used as the switch to change the gain; however, for higher frequencies a solid state switching device is required. The problems involved in solid state switching are minimized because there is usually a high value of resistance which is being switched.

It was previously explained that the time at which the rate of change equals zero is usually displaced from the 180 degree point; however, this is compensated for by using an initial attenuation of slightly less than one-half instead of one-half. The time lag due to switching can likewise be compensated for by decreasing the amount of the initial attenuation, that is, by increasing the percentage of the signal which is initially supplied to the system.

For applications which require an improvement in fall characteristics or an improvement in both the rise and fall characteristics (about zero), the same basic technique as described herein can be used. Where an improvement in fall characteristics is required, the input signal must be removed in steps similar to the manner that it is applied in steps in the previously described embodiment. In order to achieve the same effect as that previously described, slightly more than half of the signal should be initially removed from the input, and then when the rate of change in the output equals zero the remainder of the signal should be removed. Thus, an improvement in fall characteristics is obtained in a manner which is exactly analogous to the manner that the rise characteristics can be improved.

It is noted that the system described herein is adaptive since the amount of compensation (actually the time at which compensation is applied) changes if the parameters of the components in the system change. Stated differently, the time that the input signal is switched depends upon the actual reaction of the particular system, and it is not fixed at the time that the system is designed.

Figure 5:
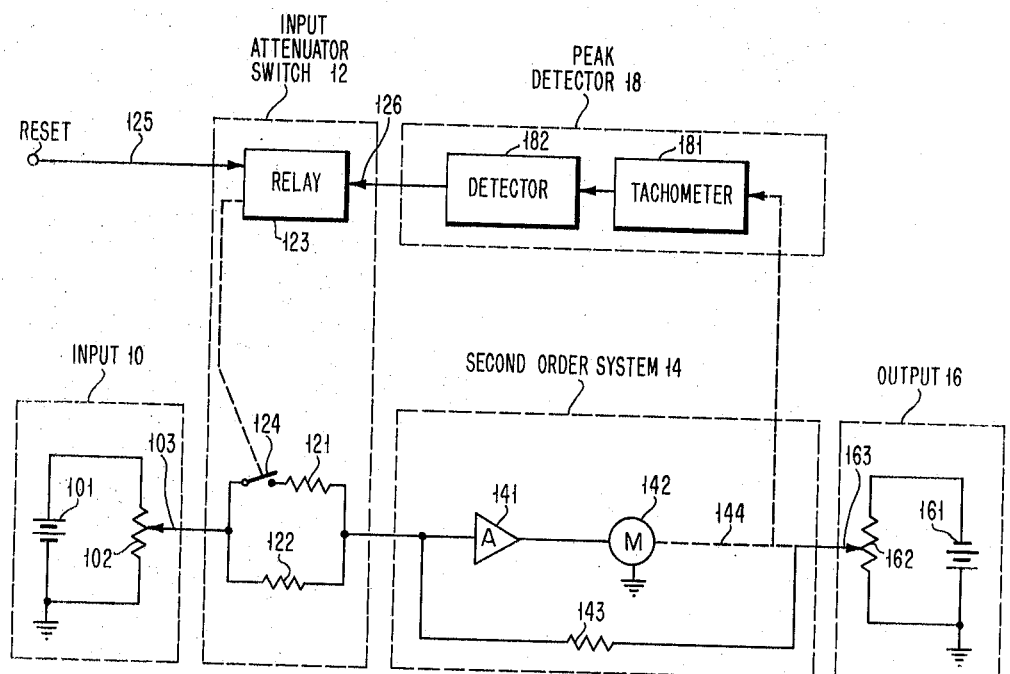
FIG. 5 shows the details of a preferred embodiment of the present invention.

The details of each of the blocks shown schematically in FIG. 1 are shown in FIG. 5. Input 10 consists of a battery 101, a resistor 102 and a movable tap 103. Input signals are supplied to the system by varying the position of tap 103.

Input attenuating switch 12 includes resistors 121 and 122, which are connected in parallel, and relay 123, which has normally open points 124 connected in series with resistor 121. Relay 123 is a holding relay which has a set input 126 and a reset input 125. Points 124 are closed when input 126 is activated, and they remain closed until input 125 is activated. When input 125 is activated, the points 124 are opened. The percentage of an input signal which is initially supplied to the second order system 14 is controlled by the relative magnitude of resistors 121 and 122. In order to apply 65% of the input initially, resistors 121 and 122 are chosen so that when points 124 are open 65% as much current flows as when points 124 are closed. Output 16 includes battery 161 and a potentiometer 162. Potentiometer 162 has a mechanically movable tap 163.

Second other system 14 includes D.C. amplifier 141, a motor 142 and a feedback resistor 143. The output of motor 142 is mechanically coupled (indicated by dotted line 144) to the movable tap 163 on potentiometer 162. Feedback resistor 143 is electrically connected to the movable tap 163.

Peak detector 18 includes a tachometer 181 and a null detector 182. Tachometer 181 is mechanically coupled to the output of motor 144 and generates a voltage, the polarity of which indicates the direction of rotation of output 144, and the magnitude of which indicates the speed of rotation. Detector 182 generates an output signal when the output of tachometer 181 changes from an increasing voltage to a steady state voltage. The output of detector 182 activates relay 123.

The term "steady state gain of the complete system" refers to the gain between the system's input and the system's output. In the specific embodiment shown it refers to the gain between input 10 and output 16. The term "steady state loop gain" refers to the gain of the feedback loop in the feedback system. In the specific embodiment shown herein the term steady state loop gain refers to the steady state gain through amplifier 141, motor 142, connection 144, and feedback resistor 143.

While the invention has been particularly shown and described with reference to a preferred embodiment thereof, it will be understood by those skilled in the art that the foregoing and other changes in the form and details may be made therein without departing from the spirit and scope of the invention.

What is claimed is:

1. A feedback control system, comprising:
    a system having an underdamped second order transfer function, said system having an output,
    means for supplying an input signal to said system,
    detecting means for detecting when the rate of change of said output goes to zero, and
    means for increasing the steady state overall gain of said system in response to said detecting means,
    whereby said output arrives at its final value in substantially a minimum amount of time and with a minimum amount of oscillation about its final value.

2. In a device for generating an output signal in response to an input signal,
    a feedback system having a second order transfer function,
    detecting means for detecting when the rate of change in said output signal is zero,
    input means for supplying a signal to said system, and
    means responsive to said detecting means for attenuating the signal supplied by said input until the rate of change in said output signal is zero,
    whereby said output signal arrives at a final value in a minimum amount of time, and whereby the output signal has a minimum amount of oscillation about said final value.

3. In combination:
    a system having an underdamped second order transfer function, said system having an output,
    detecting means for detecting when the rate of change in the output of said system equals zero,
    input means for supplying signals to said system, and
    means responsive to said detector means for increasing the steady state system gain of said system.

4. In combination:
a system having an underdamped second order transfer function, said system having an output,
detector means for detecting when the rate of change in the output of said system equals zero,
input means for supplying signals to said system, and
means responsive to said detector means for increasing the overall steady state system gain by a factor that is slightly less than two.

5. A feedback control system, comprising:
a system having an underdamped second order transfer function, said system having an output,
means for supplying input signals to said system,
detecting means for detecting when the rate of change of said output goes to zero, and
attenating means for attenuating the signals supplied by said input means until said detecting means detects a peak in the output of said system.

6. A device comprising:
a system having a second order transfer function, said system having a certain damping factor,
an input means for supplying input signals to said system,
an output means for manifesting an output signal,
said system having a certain overall steady state system gain between said input means and said output means,
detector means for detecting when the rate of change in said output signal is zero, and
means responsive to said detector means for increasing the overall steady state system gain by $k$ where $k$ equals $$\frac{e^{\pi \cot \theta}}{1+e^{t\pi \cot \theta}}$$

where $\theta$ equals arc cos $\tau$ and $\tau$ equals the system damping factor.

7. In a device for generating an output signal in response to an input signal, wherein said output signal arrives at a final value in a minimum amount of time, and wherein there is a minimum amount of oscillation about said final value,
a feedback system having a second order transfer function,
detecting means for detecting when the rate of change in the output is zero,
input means for supplying a signal to said system, and
means responsive to said detecting means for attenuating the signal supplied by said input until the rate of change in the output is zero.

8. A device comprising:
input means,
output means for manifesting an output signal,
a feedback system having a second order transfer function, said system having a certain closed loop gain,
detecting means for detecting when the rate of change of said output signal goes to zero, and
means responsive to said detecting means for increasing the steady state overall system gain between said input means and said output means without changing said closed loop gain,
whereby said output arrives at its final value in substantially a minimum amount of time and with a minimum amount of oscillation about its final value.

9. A control system, comprising:
a feedback system having a second order transfer function, said system having a certain closed loop gain,
means for supplying input signals to said system,
output means for manifesting an output signal,
detecting means for detecting when the rate of change of said output signal goes to zero, and
attenuating means for attenuating the signals supplied to said feedback system by said input means until said detecting means detects that the rate of change of said output signal is zero.

10. A device comprising:
a system having a second order transfer function,
an input means for supplying input signals to said system,
an output means for manifesting an output signal,
said system having a certain overall steady state system gain between said input means and said output means,
detector means for detecting when the rate of change in said output signal is zero, and
means responsive to said detector means for increasing the overall steady state system gain by a factor that is slightly less than two.

References Cited by the Examiner

UNITED STATES PATENTS

| | | | |
|---|---|---|---|
| 2,437,951 | 3/1948 | Godet | 333—19 X |
| 2,801,351 | 7/1957 | Calvert et al. | 307—149 |
| 2,938,170 | 5/1960 | Berry | 333—19 X |
| 3,010,035 | 11/1961 | Calvert et al. | 307—152 |
| 3,045,183 | 7/1962 | Laczko | 328—127 X |

OTHER REFERENCES

"Automatic Control Through Signal Polarities," by P. N. Nikiforuk, British Journal of Applied Physics, pp. 294–297, vol. 13, No. 6, dtd 6–62.

"Feedback Control Systems," by O. V. Smith, McGraw-Hill, 1958, pp. 331–352.

ARTHUR GAUSS, *Primary Examiner.*

S. D. MILLER, *Assistant Examiner.*